Patented July 4, 1944

2,352,606

UNITED STATES PATENT OFFICE 2,352,606

CONDENSATION PRODUCTS

Kurt Alder and Erwin Windemuth, Cologne, Germany; vested in the Alien Property Custodian No Drawing. Application July 29, 1939, Serial No. 287,408. In Germany August 1, 1938

4 Claims. (Cl. 260—617)

The present invention relates to new condensation products and to the process of preparing the same.

The so-called "diene-synthesis" resides in the addition of compounds containing two conjugated C=C double linkages with such compounds containing an ethylene or acetylene group wherein the said unsaturated linkage is likewise conjugated with another double bond. In general, the "diene-synthesis" proceeds in the following manner:

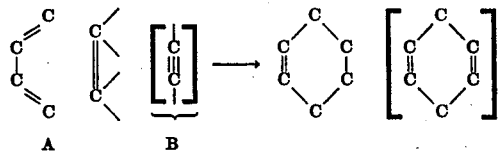

it being understood that in the reaction component designated by symbol B the unsaturated linkage is activated by another double bond as stated above. Examples for compounds of type B are 1.3-dienes, $\alpha,\beta$-unsaturated aldehydes, ketones, carboxylic acids and carboxylic acid nitriles.

The present invention is based on the observation that the "diene-synthesis" is not restricted to the situation as defined above. We have found that compounds containing non-conjugated C—C double linkages or threefold linkages and containing polar radicals, said polar radicals being separated from the said double or threefold linkages by one carbon atom, are likewise capable of forming addition products of the character described, if reacted upon with compounds containing two conjugated C=C double linkages. The term "polar radicals" comprises groups of the following type: hydroxyl, amino, aryl, halogen, carboxyl (including esterified carboxyl) nitrile, —OOC.R (R being an organic radical), and —N=C=S. Reference is made in this connection to the textbook "Stereochemie" by K. L. Wolf and O. Fuchs (1933). Examples for compounds containing 2 conjugated C=C double linkages are those commonly employed in the diene-synthesis, such as butadiene-1.3, isoprene, 2.3-dimethylbutadiene-1.3, cyclopentadiene, cyclohexadiene and anthracene. Particular importance is attached to the use of compounds of the following formula:

$$CH_2=CH.CH_2.X$$

wherein X stands for one of the above polar groups.

The reaction is performed by simply heating the mixture of the starting materials, preferably in a closed vessel. As a matter of fact care must be taken that the reaction is performed under such conditions as to prevent any substantial polymerization. To this end, polymerization inhibitors such as hydroquinone, pyrogallol and the like may be added to the reaction mixture, particularly in case of working with butadiene-1.3, isoprene and 2.3-dimethylbutadiene. As stated above, the reaction is performed at an elevated temperature, it being impossible to give definite lower and upper limits, since the optimum reaction conditions depend on the nature of the starting materials and on the tendency of the butadienes and the like to form dimeric products. In general, the dimerization process occurs more slowly than the addition of the 2 reaction components. On the other hand, some of the dimeric products may be split up into the monomeric products at a high temperature, whereas the addition products formed by the interaction of the 2 reaction components are stable at such temperatures. Thus, in case of cyclopentadiene the reaction is preferably performed at 180° C. as at this temperature the dimerics are split up so that the addition process is nearly quantitative. Other dienes such as anthracene do not show any tendency to form dimerics at the usual reaction temperature.

The new products which are obtainable in accordance with our invention may be defined as products of the addition of one to two molecules of a compound containing 2 conjugated C=C double linkages and one molecule of the other reaction component.

The following examples illustrate the present invention without, however, restricting it thereto, the parts being by weight.

Example 1

22 parts of allylalcohol and 21 parts of cyclopentadiene are heated in an autoclave for 11 hours to 175–180° C. On distilling in vacuo there is obtained in a good yield the addition product of the components at 92–94° C. under 13 mm. pressure. It represents a colorless oil of a slightly peppermint-like smell.

On subjecting the reaction product to catalytic hydrogenation it takes up two hydrogen atoms and thereby being converted into the 2.5-endo-methylenhexahydro-benzylalcohol (boiling point 95–96° C. at 13 mm. pressure). The acid phthalate has the melting point 111–112° C.

Example 2

30 parts of salicylic acid-allylester, 10 parts of cyclopentadiene and some hydroquinone are heated in an autoclave for 11 hours to 175–180° C. On distilling in vacuo the reaction product, there is obtained the addition product of the components in form of a colorless oil at 185–186° C. under 11 mm. pressure.

Upon the action of phenyl-azide the reaction product is converted into a crystalline hydrotriazole of the melting point 154° C.

Example 3

10 parts of allylalcohol (containing about 30% of water), 5 parts of anthracene and 25 parts of benzene are heated in an autoclave for 12 hours to 210° C. After distilling off the solvent there remains the addition product of the components which, after recrystallizing from high-boiling ligroine, yields colorless crystals of the melting point 112° C. The acetyl compound of the addition product melts at 122° C.

Example 4

30 parts of crotylalcohol and 50 parts of cyclopentadiene are heated in an autoclave for 12 hours to 170–180° C. In vacuo the addition product of the components distils over at 105–110° C. When acetylating the same with acetic acid anhydride, hydrogenating and saponifying there is obtained the 2.5-endomethylen-6-methyl-hexahydrobenzylalcohol of the boiling point 103–104° C. at 12 mm. pressure. The acid phthalate has the melting point 98° C.

Example 5

14 parts of allylisothiocyanate and 13 parts of 2.3-dimethyl-butadiene are heated in an autoclave for 12 hours to 145–155° C. On distilling the reaction product in vacuo there is obtained the addition product of the components in form of an oil with an intensively garlic-like smell, the melting point being 137–138° C. under 12 mm. pressure.

Example 6

10 parts of allylisothiocyanate and 6.5 parts of cyclopentadiene are heated in an autoclave for 12 hours to 145–155° C. On distilling the reaction mixture in vacuo there is obtained the addition product of the components in form of a clear oil, the boiling point being 121–123° C. under 12 mm. pressure. Upon the action of phenylazide the reaction product yields a crystalline hydrotriazole of the melting point 116–117° C.

Example 7

10 parts of allylchloride, 5 parts of anthracene and 25 parts of benzene are heated in an autoclave for 13 hours to 220° C. After recrystallizing from alcohol the addition product yields colorless needles of the melting point 115–116° C.

Example 8

100 parts of allylchloride and 50 parts of cyclopentadiene are heated in an autoclave for 8 hours to 170–180° C. After distilling off the excess allylchloride the reaction liquid is distilled in vacuo. Thereby the addition product of the components is obtained in form of a colorless oil in an excellent yield, the boiling point being 54–56° C. under 11 mm. pressure.

Upon the action of phenylazide the addition product yields a crystalline hydrotriazole of the melting point 133–134° C.

Example 9

56 parts of allyl-bromide and 27 parts of cyclopentadiene are heated in an autoclave for 8 hours to 170° C. There is obtained the addition product of the components in a very good yield at 75–77° C. under 13 mm. pressure.

Example 10

25 parts of allyliodide and 10 parts of cyclopentadiene are heated in an autoclave for 5 hours to 100–105° C. On distilling in vacuo there is obtained the addition product of the components in form of an oil of the boiling point 107–109° C. under 15 mm. pressure.

Example 11

30 parts of allylamine and 28 parts of cyclopentadiene are heated in an autoclave for 8 hours to 170° C. The addition product boils at 61–62° C. under 12 mm. pressure.

Upon subjecting the addition product in form of its hydrochloride to a catalytic hydrogenation two hydrogen atoms are taken up with the formation of the hydro-chloride of the 2.5-endomethylenehexahydrobenzylamine. The urea derivative thereof has the melting point 124° C.

Example 12

35 parts of vinyl-acetic acid and 24 parts of cyclopentadiene are heated in an autoclave for 8 hours to 175–180° C. On distilling in vacuo there is obtained the addition product of the components in form of a colorless oil of the boiling point 142–144° C. under 13 mm. pressure. For purifying the crude acid is dissolved in a sodium carbonate-solution and the solution is shaken with ether in order to remove some neutral reacting constituents; from the solution of the sodium salt the pure reaction product, i. e. the 2.5-endomethylen-$\Delta$3-tetrahydro-phenylacetic acid is obtained in form of a colorless oil of the boiling point 137–139° C. under 12 mm. pressure.

When hydrogenating this acid, the saturated 2.5-endomethylen-hexahydro-phenylacetic acid is formed, the anilide of which melts at 138° C.

Example 13

15 parts of allylcyanide and 12 parts of cyclopentadiene are heated in an autoclave for 12 hours to 170–180° C. On distilling off the reaction product in vacuo there is obtained the addition product at 89–93° C. under 11 mm. pressure. It represents a colorless oil with a strongly clove oil-like smell. The addition product contains the components in the molecular proportion and yields with phenylazide a crystalline hydrotriazole. Melting point: 174–175° C.

Besides this normal addition product there is obtained a second one in a small amount which contains cyclopentadiene and allylcyanide in the relative proportion 2:1, boiling point being 165° C. under 11 mm. pressure. With phenylazide there is obtained a hydrotriazole of the melting point 202–203° C.

Example 14

67 parts of eugenole and 27 parts of cyclopentadiene are heated in an autoclave for 8 hours to 170–180° C. On distilling in vacuo there is obtained besides some dicyclopentadiene and unchanged starting materials the addition product in form of a colorless oil of the boiling point 138–142° C. at 0.1 mm. pressure, the melting point being 35° C.

With phenylazide there is obtained a hydrotriazole of the melting point 210–211° C.

Example 15

10 parts of buten-2-diole-1.4, 10 parts of cyclopentadiene and 20 parts of dioxane are heated in an autoclave for 8 hours to 175–180° C. On distilling in vacuo there is obtained in a good yield besides some di- and tricyclopentadiene the addition product of the components in form of a colorless oil (boiling point 165–170° C. under 13 mm. pressure) which directly crystallizes.

Example 16

10 parts of 2-methyl-butin-3-ol-1 and 10 parts of cyclopentadiene are heated in an autoclave for 8 hours to 180–185° C. On distilling in vacuo there is obtained besides some methyl-butin-ol and dicyclopentadiene the addition product of the components in form of a colorless oil (boiling point 77–83° C. under 13 mm. pressure) with an eucalyptus-like smell.

We claim:

1. The process of forming cyclic compounds which comprises heating an alpha, gamma diene with a compound containing a carbon to carbon double bond and a hydroxyl group, the said hydroxyl group being separated from the carbon to carbon double bond by one carbon atom, said compound being selected from the group consisting of allyl alcohol, crotyl alcohol and butene-2-diol-1.4, the reaction being performed under such conditions as to prevent any substantial polymerization.

2. The process of forming cyclic compounds which comprises heating an alpha, gamma diene with allyl alcohol, the reaction being performed under such conditions as to prevent any substantial polymerization.

3. The process of forming cyclic compounds which comprises heating an alpha, gamma diene with crotyl alcohol, the reaction being performed under such conditions as to prevent any substantial polymerization.

4. The process of forming cyclic compounds which comprises heating an alpha, gamma diene with buten-2-diol-1.4, the reaction being performed under such conditions as to prevent any substantial polymerization.

KURT ALDER.
ERWIN WINDEMUTH.